(12) United States Patent
Nelson (10) Patent No.: US 11,156,299 B2
(45) Date of Patent: Oct. 26, 2021

(54) VALVE WITH EXPANDABLE SLEEVE FITTED OVER PERFORATED WALLS OF INLET AND OUTLET CHANNELS TO CONTROL FLOW THEREBETWEEN

(71) Applicant: Sur-Flo Meters & Controls Ltd, Calgary (CA)

(72) Inventor: Darrell Nelson, Calgary (CA)

(73) Assignee: Sur-Flo Meters & Controls Ltd, Calgary (CA)

( * ) Notice: Subject to any disclaimer, the term of this patent is extended or adjusted under 35 U.S.C. 154(b) by 0 days.

(21) Appl. No.: 16/807,439

(22) Filed: Mar. 3, 2020

(65) Prior Publication Data

US 2020/0386339 A1 Dec. 10, 2020

Related U.S. Application Data

(62) Division of application No. 15/812,579, filed on Nov. 14, 2017, now abandoned.

(51) Int. Cl.
| | |
|---|---|
| *F16K 7/07* | (2006.01) |
| *F16K 3/24* | (2006.01) |
| *G05D 16/06* | (2006.01) |
| *F16K 17/36* | (2006.01) |
| *F16K 3/26* | (2006.01) |
| *G05D 1/00* | (2006.01) |
| *F16K 21/16* | (2006.01) |

(52) U.S. Cl.
CPC .............. *F16K 7/075* (2013.01); *F16K 3/243* (2013.01); *F16K 3/262* (2013.01); *F16K 17/36* (2013.01); *G05D 1/00* (2013.01); *G05D 16/0641* (2013.01); *F16K 21/16* (2013.01)

(58) Field of Classification Search
CPC ........... G05D 7/02; F16K 7/075; F16K 3/243; F16K 3/262; F16K 21/16; Y10T 137/776; Y10T 137/86171
USPC ................................ 137/487, 565.35; 251/5
See application file for complete search history.

(56) References Cited

U.S. PATENT DOCUMENTS

| | | | | |
|---|---|---|---|---|
| 994,167 | A | ‡ | 6/1911 Koppitz | ................ F16K 17/105 137/492 |
| 1,228,104 | A | ‡ | 5/1917 Fulton | .................. G05D 16/163 137/489 |

(Continued)

*Primary Examiner* — William M McCalister
(74) *Attorney, Agent, or Firm* — Kyle R Satterthwaite; Michael R Williams; Ade & Company Inc.

(57) ABSTRACT

A valve features an outer housing, in which there are provided inlet and outlet channels respectively reaching into the housing from inlet and outlet openings thereof. The two channels are axially closed at adjacent inner ends thereof, but feature perforated circumferential walls. A resiliently expandable sleeve is disposed around the circumferential walls in a position normally overlying the perforations, while leaving a gap between the sleeve and inner surfaces of the housing. A charging port communicates with the gap to enable pressurization thereof. Pressurization of the gap normally holds the sleeve tightly over the perforations to prevent flow from one channel to the other. When pressure in the inlet channel exceeds the pressure in the charging chamber, the sleeve radially expands from the circumferential walls of the channels to uncover the perforations and allow fluid to flow between the channels.

8 Claims, 7 Drawing Sheets

(56) References Cited

U.S. PATENT DOCUMENTS

| | | | | |
|---|---|---|---|---|
| 1,311,536 A | ‡ | 7/1919 | Smoot | G05D 16/163 137/489 |
| 2,467,150 A | * | 4/1949 | Nordell | F16K 7/075 137/487 |
| 2,964,116 A | * | 12/1960 | Peterson | E21B 47/24 175/48 |
| 3,177,891 A | * | 4/1965 | Reese | F16K 31/365 137/495 |
| 3,467,131 A | * | 9/1969 | Ratelband | F16K 7/075 137/269 |
| 3,552,712 A | * | 1/1971 | Whitlock | F16K 7/07 251/5 |
| 3,592,223 A | * | 7/1971 | Reese | G05D 16/163 137/469 |
| 3,669,142 A | * | 6/1972 | Gerbic | G05D 16/163 137/489 |
| 3,669,143 A | * | 6/1972 | Reese | F16K 31/36 137/512.3 |
| 3,746,027 A | * | 7/1973 | Elliott | F17D 1/14 137/1 |
| 3,838,704 A | * | 10/1974 | Johnson | F16K 7/075 137/15.18 |
| 3,983,895 A | * | 10/1976 | Pouska | F16L 55/46 137/268 |
| 4,050,669 A | * | 9/1977 | Brumm | F16K 7/075 251/5 |
| 4,083,375 A | * | 4/1978 | Johnson | F16K 7/075 137/489 |
| 4,253,484 A | * | 3/1981 | Danon | G05D 16/163 137/269 |
| 4,310,140 A | * | 1/1982 | Boomer | F16K 7/075 251/5 |
| 4,395,016 A | * | 7/1983 | Welker | F16K 7/075 137/269 |
| 4,451,023 A | * | 5/1984 | Zakai | F16K 7/075 251/5 |
| 4,645,174 A | * | 2/1987 | Hicks | G01F 25/0007 251/5 |
| 4,697,616 A | * | 10/1987 | Ashcroft | G05D 7/03 137/486 |
| 4,715,578 A | * | 12/1987 | Seltzer | F16K 7/17 251/25 |
| 4,824,072 A | * | 4/1989 | Zakai | F16K 7/075 251/5 |
| 5,000,214 A | * | 3/1991 | Pelkey | G05D 16/163 137/14 |
| 5,035,259 A | * | 7/1991 | Allen | F16K 31/52491 137/488 |
| 5,036,879 A | * | 8/1991 | Ponci | F17D 1/20 137/496 |
| 5,158,230 A | * | 10/1992 | Curran | F24F 13/10 236/49.4 |
| 5,186,431 A | * | 2/1993 | Tamari | F16K 7/07 251/5 |
| 5,391,209 A | * | 2/1995 | Pelkey | F17D 1/20 137/14 |
| 5,671,774 A | * | 9/1997 | Klein | F16K 7/075 137/486 |
| 5,816,286 A | * | 10/1998 | Scott | G05D 16/163 137/489 |
| 6,189,857 B1 | * | 2/2001 | Zeger | F16K 7/075 137/355.18 |
| 6,672,334 B2 | * | 1/2004 | Gill | F16K 7/075 137/601.03 |
| 6,948,696 B1 | * | 9/2005 | Aanonsen | F16K 7/061 251/4 |
| 7,077,160 B1 | * | 7/2006 | Ratz | E03B 5/02 137/565.33 |
| 7,665,713 B1 | * | 2/2010 | Clark | F16K 31/0627 251/5 |
| 8,091,582 B2 | * | 1/2012 | Folk | F16K 31/1262 137/489 |
| 8,506,259 B2 | * | 8/2013 | Kurz | F04B 41/06 417/3 |
| 9,718,082 B2 | ‡ | 8/2017 | deVilliers | B05C 5/0225 |
| 2004/0182451 A1 | * | 9/2004 | Poirier | E03B 7/09 137/563 |
| 2005/0268971 A1 | * | 12/2005 | Nasalroad | F16K 24/046 137/565.13 |
| 2008/0142747 A1 | * | 6/2008 | Jennings | F16K 7/075 251/5 |
| 2012/0024394 A1 | * | 2/2012 | Bounouar | F04D 19/04 137/14 |
| 2014/0158242 A1 | * | 6/2014 | Schreiner | B64D 11/02 137/899.2 |
| 2014/0345722 A1 | * | 11/2014 | Markert | F02M 25/0228 137/565.35 |
| 2015/0020888 A1 | * | 1/2015 | Baker | F02C 7/236 137/12 |
| 2015/0020889 A1 | * | 1/2015 | Baker | F02C 9/263 137/12 |
| 2016/0186415 A1 | * | 6/2016 | Yuge | F24D 17/0026 137/340 |

\* cited by examiner
‡ imported from a related application

VALVE WITH EXPANDABLE SLEEVE FITTED OVER PERFORATED WALLS OF INLET AND OUTLET CHANNELS TO CONTROL FLOW THEREBETWEEN

CROSS-REFERENCE TO RELATED APPLICATIONS

This application is a divisional of U.S. Non-provisional application Ser. No. 15/812,579, filed Nov. 14, 2017, the entirety of which is incorporated herein by reference.

FIELD OF THE INVENTION

The present invention relates generally to valves, and more particularly to a unique valve construction useable in a number of different valve applications.

BACKGROUND

Conventional valve designs typically employ springs and diaphragms to control opening and closing of the valve, are can be prone to failure and be difficult to repair. Accordingly, there exits a desire for improved and alternative valve designs that may be useful in a variety of applications.

SUMMARY OF THE INVENTION

According to one aspect of the invention, there is provided a valve installation comprising:
  a first sleeve valve installed in a bypass line of a pump or compressor and comprising:
    an outer housing having an inlet by which fluid is introducible into an interior of said housing and an outlet by which said fluid is exhaustible from said housing;
    an inlet channel extending further into the interior of the housing from the inlet thereof to a closed end of said inlet channel situated opposite of the inlet of the housing;
    a first circumferential wall surrounding said inlet channel between the closed end thereof and the inlet of the housing;
    an outlet channel extending further into the interior of the housing from the outlet thereof to a closed end of said outlet channel situated opposite to the outlet of the housing;
    a second circumferential wall surrounding said outlet channel between the closed end thereof and the outlet of the housing;
    a first set of one or more perforations in said first circumferential wall;
    a second set of one or more perforations in said second circumferential wall;
    a resiliently expandable sleeve disposed around the first and second circumferential walls within the interior of the outer housing in a position overlying said first and second sets of perforations;
    an expansion gap between said resiliently expandable sleeve and interior wall surfaces of the housing to accommodate expansion of said sleeve outwardly from the first and second circumferential walls to open up said first and second sets of perforations; and
    a charging port opening into the interior the housing and communicating with the expansion gap therein to enable pressurization of said expansion gap, whereby the sleeve is expandable off of the first and second circumferential walls to open up the first and second sets of one more perforations when an inlet pressure in the inlet channel exceeds a charge pressure in the expansion gap to enable fluid flow between the inlet and outlet channels via the first and second sets of perforations;
  an upstream pipe of the bypass line coupled to the sleeve valve in a position feeding into the inlet thereof;
  a downstream pipe of the bypass line coupled to the sleeve valve in a position exhausting the outlet thereof;
  a first sensing line installed in a configuration enabling pressurization of the expansion gap from the upstream pipe; and
  a second sensing line installed in a configuration enabling venting of the expansion gap to the downstream pipe;
  a pressure reducing regulator valve installed in the second sensing line;
  a back-pressure regulator valve connected in parallel with said pressure reducing regular valve; and
  a second sleeve valve of same type as the first sleeve valve and installed in a discharge line running from an outlet of the pump or compressor, wherein the charge port of said second sleeve valve is connected to a pre-loaded expansion vessel to pressurize the expansion gap inside the valve housing of the second sleeve valve, and thereby prevent opening of the second valve until the inlet channel of the second valve achieves greater pressure than said pre-loaded expansion vessel.

According to a second aspect of the invention, there is provided a valve assembly comprising:
a sleeve valve comprising:
  an outer housing having an inlet by which fluid is introducible into an interior of said housing and an outlet by which said fluid is exhaustible from said housing;
  an inlet channel extending further into the interior of the housing from the inlet thereof to a closed end of said inlet channel situated opposite of the inlet of the housing;
  a first circumferential wall surrounding said inlet channel between the closed end thereof and the inlet of the housing;
  an outlet channel extending further into the interior of the housing from the outlet thereof to a closed end of said inlet channel situated opposite to the outlet of the housing;
  a first set of one or more perforations in said first circumferential wall; a second set of one or more perforations in said second circumferential wall;
  a resiliently expandable sleeve disposed around the first and second circumferential walls within the interior of the outer housing in a position overlying said first and second sets of perforations;
  an expansion gap between said resiliently expandable sleeve and interior wall surfaces of the housing to accommodate expansion of said sleeve outwardly from the first and second circumferential walls to open up said first and second sets of perforations; and
  a charging port opening into the interior the housing and communicating with the expansion gap therein to enable pressurization of said expansion gap, whereby the sleeve is expandable off of the first and second circumferential walls to open up the first and second sets of one more perforations when an inlet pressure in the inlet channel exceeds a charge pressure in the expansion gap to enable fluid flow between the inlet and outlet channels via the first and second sets of perforations; and a pre-loaded expansion vessel connected to the charge port of the sleeve valve to pressurize the expansion gap inside the valve housing of the sleeve valve, and thereby prevent opening of the second valve until the inlet channel of the second valve achieves greater pressure than said pre-loaded expansion vessel.

According to a third aspect of the invention, there is provided a valve installation comprising:

a first sleeve valve installed in a bypass line of a pump or compressor, and a matching second sleeve valve installed in a discharge line running from an outlet of said pump or compressor, wherein each sleeve valve comprises:

an outer housing having an inlet by which fluid is introducible into an interior of said housing and an outlet by which said fluid is exhaustible from said housing;

an inlet channel extending further into the interior of the housing from the inlet thereof to a closed end of said inlet channel situated opposite of the inlet of the housing;

a first circumferential wall surrounding said inlet channel between the closed end thereof and the inlet of the housing;

an outlet channel extending further into the interior of the housing from the outlet thereof to a closed end of said outlet channel situated opposite to the outlet of the housing;

a second circumferential wall surrounding said outlet channel between the closed end thereof and the outlet of the housing;

a first set of one or more perforations in said first circumferential wall;

a second set of one or more perforations in said second circumferential wall;

a resiliently expandable sleeve disposed around the first and second circumferential walls within the interior of the outer housing in a position overlying said first and second sets of perforations;

an expansion gap between said resiliently expandable sleeve and interior wall surfaces of the housing to accommodate expansion of said sleeve outwardly from the first and second circumferential walls to open up said first and second sets of perforations; and a charging port opening into the interior the housing and communicating with the expansion gap therein to enable pressurization of said expansion gap;

wherein the sleeve is expandable off of the first and second circumferential walls to open up the first and second sets of one more perforations when an inlet pressure in the inlet channel exceeds a charge pressure in the expansion gap to enable fluid flow between the inlet and outlet channels via the first and second sets of perforations.

BRIEF DESCRIPTION OF THE DRAWINGS

One embodiment of the invention will now be described in conjunction with the accompanying drawings in which.

DETAILED DESCRIPTION

Figure 1:
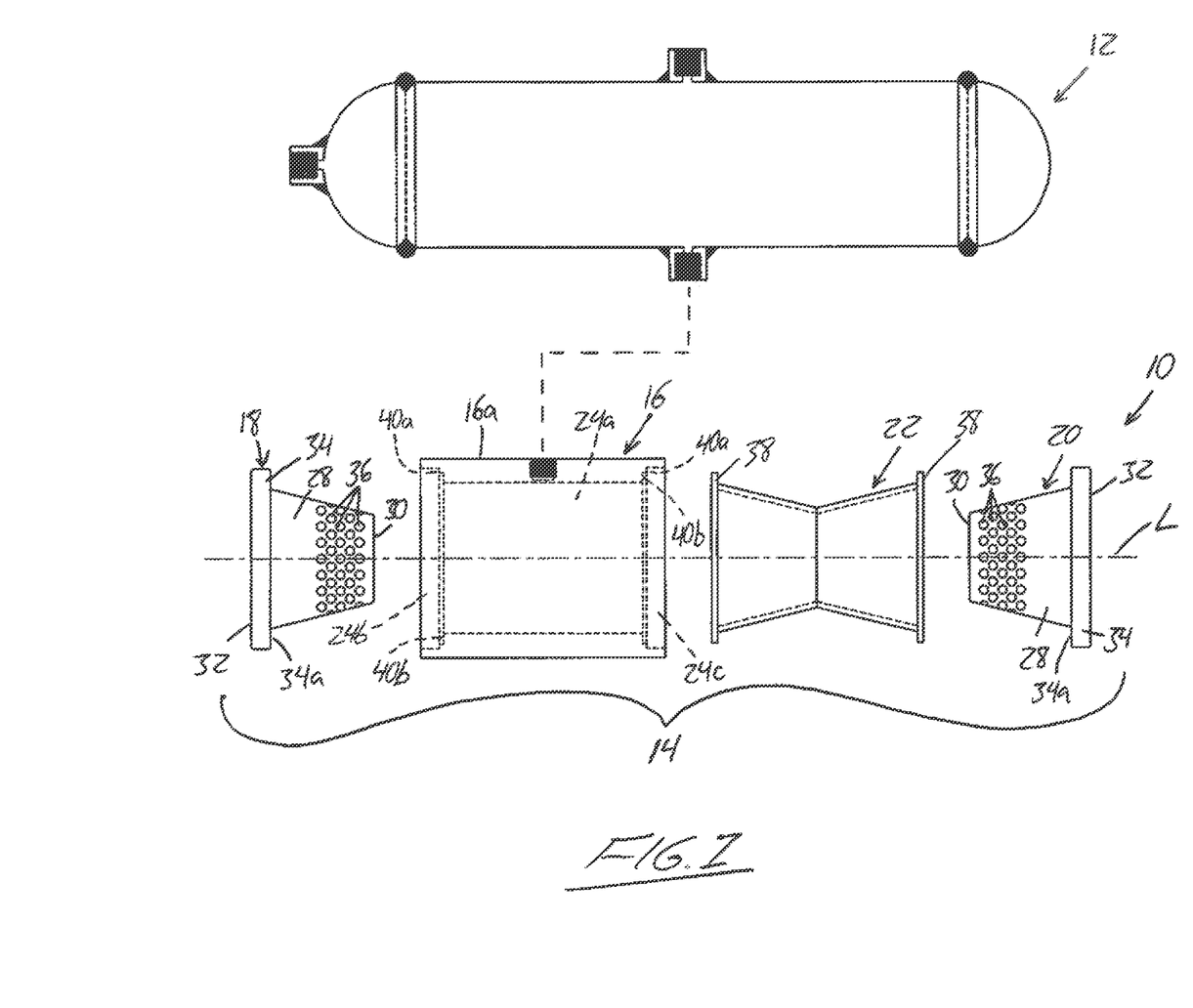
FIG. 1 is an exploded side view of a unique multi-purpose valve of the present invention, together with an optional expansion vessel usable therewith in back-pressure or relief valve applications.

FIG. 1 illustrates assembly of a unique multi-purpose valve 10 according to one embodiment of the present invention, and the optional installation of an expansion bottle or other expansion vessel 12 on the valve for particular use thereof in a back-pressure or relief valve applications.

The multi-purpose valve 10 of the illustrated embodiment is easily assembled from a simple four-piece kit 14, among which two pieces may be identical to one another to further increase the simplicity and manufacturing expense of the multi-purpose valve. The four pieces include an outer housing 16, a perforated internal inlet component 18, a perforated internal outlet component 20 identical to said inlet component 18, and an internal resiliently expandable sleeve 22. The inlet component 18, outlet component 20 and expandable sleeve 22 are labeled as "internal" since they reside internally of the hollow outer housing 16 in the fully assembled state of the multi-purpose valve 10.

The outer housing 16 is a hollow shell having a cylindrical exterior 16a and a hollow interior having a cylindrical main bore 24a that spans a substantial majority of the housing's axial length between opposing inlet and outlet ends 16b, 16c thereof. Each end of the main bore 24a opens into a respective larger-diameter counterbore 24b, 24c that spans from the main bore 24 to a respective end 16b, 16c of the housing 16. Opening through the inlet end 16b of the housing 16, counterbore 24b defines an inlet opening by through which fluid is admissible to the housing, while counterbore 24c similarly opens through the outlet end 16c of the housing 16 to define an outlet opening by which fluid is exhaustable from the housing 16. A charging port 26 passes radially through the exterior surface 16a of the housing 16 into the main bore 24a of the housing interior, and is threaded to enable removable connection of the charging port to one or more lines outside the housing using a threaded fitting.

Each perforated component 18, 20 features a circumferential wall 28 that spans concentrically around a central longitudinal axis L that it shares with sleeve 22 and housing 16 in the fully assembled state of the valve 10. A hollow interior of each perforated component 18, 20 delimited by said circumferential wall 28 is closed off by an end wall at a closed inner end 30 of the perforated component 18, 20 that lies axially opposite an open outer end 32 thereof. At the open outer end 32, each perforated component 18, 20 has a built-up outer flange 34 that projects radially outward from the circumferential wall 28.

The circumferential wall 28 of each perforated component 18, 20 is perforated, at least at an area thereof near the closed inner end 30, and preferably includes a set uniformly spaced perforations 36 evenly arrayed around the full circumference of the wall 28. Each counterbore 24b, 24c of the housing's interior has a diameter equal to or slightly greater than that of the outer flange 34 of the respective perforated component, while the diameter of the housing's main bore 24a is smaller in diameter than the outer flange 34 of each perforated component. Accordingly, the unflanged area of the circumferential wall 28 of each perforated internal component is insertable into the main bore 24a of the housing 16, while the outer flange 34 can only fit into the counterbore, and thus forms a stop limiting the distance by which the each perforated internal component can be inserted into the housing. To accommodate insertion of both perforated components 18, 20 inside the housing, the axial length of each perforated component from the closed inner end 30 thereof to the outer flange 34 at the open outer end does not exceed half of the axial length of the housing's main bore 24a between the two counterbores. In the assembled state of the valve, the fully inserted perforated components thus lie generally end-to-end with one another with their closed inner ends in abutted contact or close proximity at or adjacent a mid-plane of the housing.

The internal sleeve 22 is formed of rubber or other resiliently flexible material that can allow temporarily radial expansion thereof. The sleeve is symmetrical about a mid-plane thereof that lies at an axial center of the sleeve 22 in an orientation normal to the longitudinal axis L. Each of the two symmetric halves of the sleeve on opposite sides of this mid-plane is intended to receive the circumferential wall 28 of a respective one of the two perforated internal components during assembly of the valve.

In the illustrated embodiment, the circumferential wall of each perforated internal component is externally tapered in a frusto-conical manner narrowing toward the closed inner end 30 of the component from the flanged open outer end 32 thereof. Likewise, the interior and exterior of each half of the sleeve is frusto-conically tapered at a matching angle to that of the circumferential wall 28 of the respective perforated component 18, 20 so that the sleeve narrows in diameter toward its axial center, but has a uniform wall thickness. The tapered shapes of the perforated components 18, 20 and sleeve 22 enables easier insertion of each perforated component 18, 20 into the sleeve 22. However, it will be appreciated that the perforated components and the sleeve need not necessarily be tapered for the valve to operate in the manner described below, and for example, the sleeve and the perforated circumferential walls 28 may alternatively be cylindrical in shape with a uniform diameter.

At each end of the sleeve 22, i.e. at the wider end of each tapered half, the sleeve has a radially enlarged lip 38 jutting outward from the remainder of the sleeve. The lip 38 is greater in diameter of the housing's main bore 24a, but smaller in diameter than the housing's counterbores 24b, 24c and the perforated components' outer flanges 34. The symmetrically tapered remainder of the sleeve between the enlarged lips 38 however are smaller in diameter than the main bore 24a of the housing so as to fit therein in the fully assembled state of the valve. The axial length of the sleeve between the two end lips 38 is generally equal to the axial length of the housing's main bore 24a. Accordingly, the axial length of each of the two symmetrically tapered areas of the sleeve is generally half of the main bore's axial length.

A stepped transition from the larger diameter of each counterbore 24b, 24c of the housing 16 down to the smaller diameter of the main bore 24a provides the housing 16 with a pair of internal annular shoulders at each counterbore. Each of these shoulders faces outwardly from the housing through respective open end thereof. The outer shoulder 40a is nearer to the respective end of the housing and is of larger diameter than the smaller inner shoulder 40b situated nearer the axial center of the housing. At each counterbore 24b, 24c, the outer shoulder 40a forms a stop surface for blocking the outer flange 34 of the respective perforated component 18, 20 from reaching the main bore 24a during insertion of the perforated component into the housing. The inner shoulder 40b defines a seat against which the enlarged lip 38 at the respective end of the sleeve 22 is seated when installed in the housing, whereby the two lips 38 maintain the sleeve 22 in an axially centered position in the housing so that the two tapered halves of the sleeve occupy respective halves of the housing's main bore 24a.

To assemble the valve, one end of the sleeve is pinched into a temporarily collapsed state of smaller than normal size, as allowed by the rubber or other resiliently flexible material construction of the sleeve, and this temporary collapse of this end of the sleeve to a smaller size than the main bore diameter of the housing enables this end of the sleeve to be passed through the main bore 24a from one counterbore to the other until the other non-collapsed end of the sleeve reaches the inner annular shoulder 40b at the counterbore through which the collapsed end of the sleeve was inserted. At this point, the temporarily collapsed state of the sleeve end is relieved, whereupon this end of the sleeve returns to its default shape and size, thus placing the enlarged lip of this end of the sleeve over the respective inner shoulder 40b of the housing. Each perforated component 18, 20 is then inserted into the respective half of the sleeve 32 through the respective open end of the housing, until the outer flange 34 of the perforated component abuts against the enlarged lip 38 at the respective end of the sleeve. This pushes the sleeve lip 38 against the inner shoulder 40b of the housing. As an alternative to installing the sleeve before either of the perforated components, one may instead insert one of the perforated components into its respective half of the sleeve, and then push the other end of the sleeve through the main bore of the housing in a temporarily collapsed state before inserting the other perforated component.

FIGS. 2 through 7 show the multi-purpose valve in its fully assembled state in a number of different applications. In the valve's assembled state, the hollow interior of each perforated component 18, 20 defines a respective channel leading toward the axial center of the housing from the respective open end of the housing. The housing 16, with suitable gaskets at its ends, is placed between two pipe flanges 42 respectively found on an upstream pipe 44 and a downstream pipe 45 that are to be coupled together by the valve once installed. The two pipe flanges 42 are then bolted together by threaded fasteners 48 (e.g. threaded studs and mating nuts), tightening of which draws the two pipe flanges toward one another against the ends of the valve housing 16. This tightening action pushes the outer flange 34 of each perforated component 18, 20 of the valve axially inward toward the center of the valve housing 16, and this axially inward force on the outer flange 34 likewise pushes axially inward on the enlarged lip 38 at the respective end of the sleeve 22, forcing the lip 38 tightly against the inner shoulder 40b of the housing. The rubber or other resilient material of the sleeve lip 38 thus forms a fluid tight seal between the flange 34 of the perforated component and the inner shoulder of 40b of the housing. Accordingly, any fluid entering the housing from either end thereof cannot seep between the sleeve and the inner walls of the housing, or between the sleeve and the circumferential wall of the respective perforated component.

Since the diameter of the sleeve at the tapered areas between the two enlarged lips 38 is less than the diameter of the housing's main bore, this leaves an annular gap space open between the exterior of the sleeve and the inner wall surfaces of the housing 16 to serve as a charging chamber 46. The charging port 26 opening into the main bore 24a thus fluidly communicates with this charging chamber to enable pressurization of the charging chamber from a suitable fluid supply connected to the charging port. Pressurization of this charging chamber 46 provides resistance to radial expansion of the resiliently stretchable sleeve, and thus normally holds the sleeve in a radially unstretched state sealed against the outer surfaces of the circumferential walls of the perforated components, thereby closing off the perforations 36 therein. Since the inner ends 30 of the two perforated components 18, 20 are closed, fluid cannot travel axially between the hollow interiors of the two perforated components. Accordingly, the inlet channel defined by perforated inlet component 18 and the outlet channel defined by the perforated outlet component 20 are axially closed off from one another.

As a result, the only available flow path from one perforated component to the other is by exiting one perforated component through its perforations 36, and then entering the other perforated component through its perforations 36. The normal unstretched state of the sleeve 22 fits snugly over the circumferential walls of the two perforated components, thus normally closing off the perforations and preventing any and all flow through the valve. The valve is only opened when the pressure inside the perforated inlet component 18 exceeds the pressure in the charging chamber 46, whereby the internal pressure in the perforated component pushes outward on the sleeve through the perforations to radially stretch the sleeve outwardly off both of the circumferential walls to open up the perforations therein. Should the pressure of the charge chamber once again exceed the pressure inside the inlet component 18, the sleeve will collapse back to its normal unstretched size in sealed contact against the circumferential walls of the perforated components, thus closing off the perforations and achieving the closed state of the valve.

Figure 2:
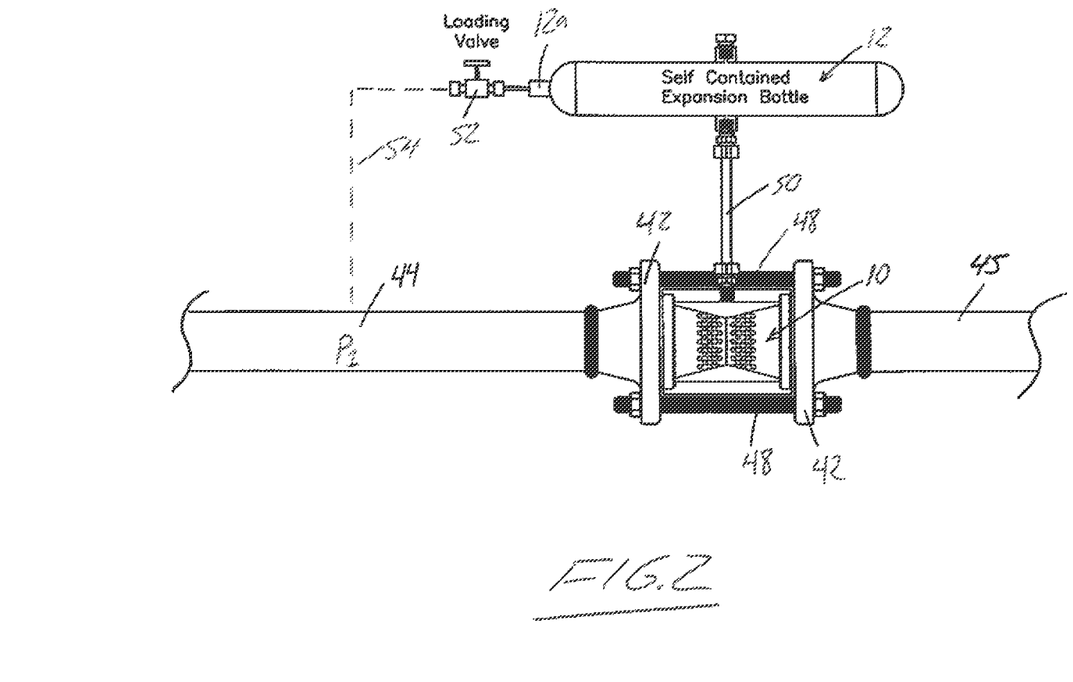
FIG. 2 illustrates use of the multi-purpose valve and expansion vessel of FIG. 1 in a back-pressure application.

In the application shown in FIG. 2, the multi-purpose valve 10 forms a back-pressure valve. In this application, the expansion vessel 12 of FIG. 1 is connection to the charging port 26 of the valve housing 16 by a connection line 50. Via a loading valve 52 connected to an inlet 12a of the expansion vessel 12, the expansion vessel is pre-loaded with a gas, e.g. nitrogen or the field gas, to charge the expansion vessel 12 to a desired set pressure. To ensure no damage is incurred by the sleeve 22, this pre-charging of the expansion vessel should be performed before allowing any flow through the multi-purpose valve 10. Optionally, the expansion vessel can be charged using field gas pressure from the upstream pipe 44 by connecting a slip line 54 from the upstream pipe 44 to the loading valve 52, as shown in broken lines. As the pressure $P_1$ in the upstream pipe 44 builds up, it will build up pressure in the expansion vessel 12 at the same rate. Once the desired pressure level is achieved in the expansion vessel, the loading valve 52 is closed. Connected to the expansion vessel by connection line 50, the charging chamber 46 is pressurized by the contents of the expansion vessel 12, which therefore defines the set pressure at which the multi-purpose valve will open.

The valve will only open when the upstream pressure $P_1$ exceeds this set pressure, whereby this pressure differential across the sleeve between the upstream pressure $P_1$ in the inlet channel of the multi-purpose valve 10 and the charge pressure in the charging chamber 46 expands the sleeve 22 radially outward off the circumferential walls 28 around the inlet and outlet channels, thus allowing fluid to flow from the inlet channel into the outlet channel via the perforations 36 in the circumferential walls 28 of these channels. The expansion vessel 12 is preferably supported on the valve housing 16 by the connection line 50, and not mounted to a building wall or other structure that is subject to temperature variations that my influence the temperature inside the vessel 12 and thus affect the set pressure of valve 10. It will be appreciated that the same setup of the pre-charged expansion vessel 12 enables use of the multi-purpose valve 10 as a relief valve for exhausting excess pressure from a main fluid line, where the upstream pipe (and downstream pipe, if included) of FIG. 2 are in a disposal/relief line and not a main through line of the overall flow circuit of the installation environment.

Figure 3:
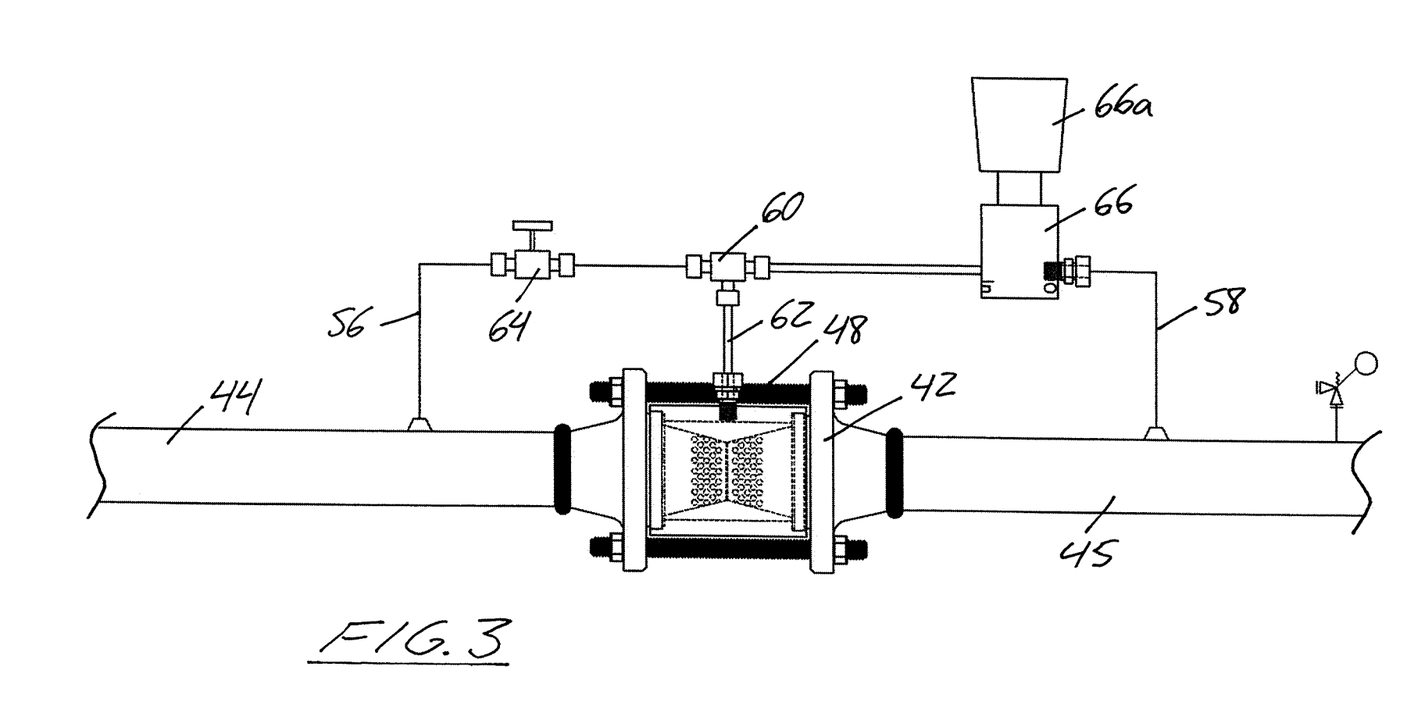
FIG. 3 illustrates use of the multi-purpose valve of FIG. 1 in a manually adjustable pressure reduction application.

In the application shown in FIG. 3, the multi-purpose valve 10 forms a pressure reduction valve for providing a controlled pressure drop from upstream pipe 44 to downstream pipe 45. Here, a first sensing line 56 is connected to the upstream pipe 44, and a second sensing line 58 is connected to the downstream pipe 45. The sensing lines are typically connected to the pipes by thread-o-lets. The sensing lines 56, 58 are connected together by A T-fitting 60, which in turn connects them to the charging port 26 of the multi-purpose valve, for example by way of a pipe nipple 62. A restrictor valve 64 is installed between the first sensing line 56, and a pressure reducing regulator valve 66 is installed in the second sensing line. Setting the regulator valve 66 will determine the resulting pressure $P_2$ in the downstream pipe. In the case of a manually operated regulator valve 66, turning an adjustment cap 66a of the regulator 66 in one direction will increase the resulting downstream pressure $P_2$, while rotation of the adjustment cap 66a in the other direction will reduce the resulting downstream pressure $P_2$. The restrictor valve is used to adjust the sensitivity or response time of the multi-purpose valve 10. When commissioned, the restrictor valve 64 must have a smaller flow coefficient $C_v$ than the regulator valve 66. Increasing the restrictor valve's flow coefficient $C_v$ will cause the multi-purpose valve 10 to lock up quickly as the downstream pressure $P_2$ approaches the regulators set pressure. Decreasing the restrictor's flow coefficient $C_v$ will cause the multi-purpose valve 10 to open quickly as the downstream pressure $P_2$ decreases. Increased demand will likewise increase the opening speed of the valve 10.

Once the multi-purpose valve 10 is up and running, a pressure gauge connected to the charge chamber, and for example located on the inlet of the regulator 66, will indicate how the valve is operating. If the charge chamber pressure is equal to the upstream pressure $P_1$, the multi-purpose valve is known to be locked up in a fully closed position with nothing flowing through the valve. As the charge chamber pressure drops, this indicates that the valve has opened, and fluid is flowing therethrough. The lower the charge chamber pressure is in relation to the upstream pressure $P_1$, the more open the valve is.

If the regulator valve 66 is not factory set to a suitable value for the intended installation at initial start-up, one would initially back the regulator valve 66 off to a closed position to restrict any flow through the multi-purpose valve to avoid having the downstream pressure $P_2$ exceed the desired working pressure. Caution should be taken that the differential between the charge chamber pressure and the initial pressure in the downstream pipe 45 does not exceed the sleeve's maximum allowable differential pressure, or the sleeve may be damaged by extrusion thereof through the perforations 36. Once suitable upstream pressure $P_1$ is built up, one would then start to open up the regulator valve 66, allowing flow to start through the multi-purpose valve 10. Further opening of the regulator valve 66 is then performed until the desired downstream pressure $P_2$ is achieved. At start up, the restrictor valve 64 should be at an intermediate setting. Once the system is up and running, the restrictor valve setting can be adjusted to achieve desirable operating parameters.

Figure 4:
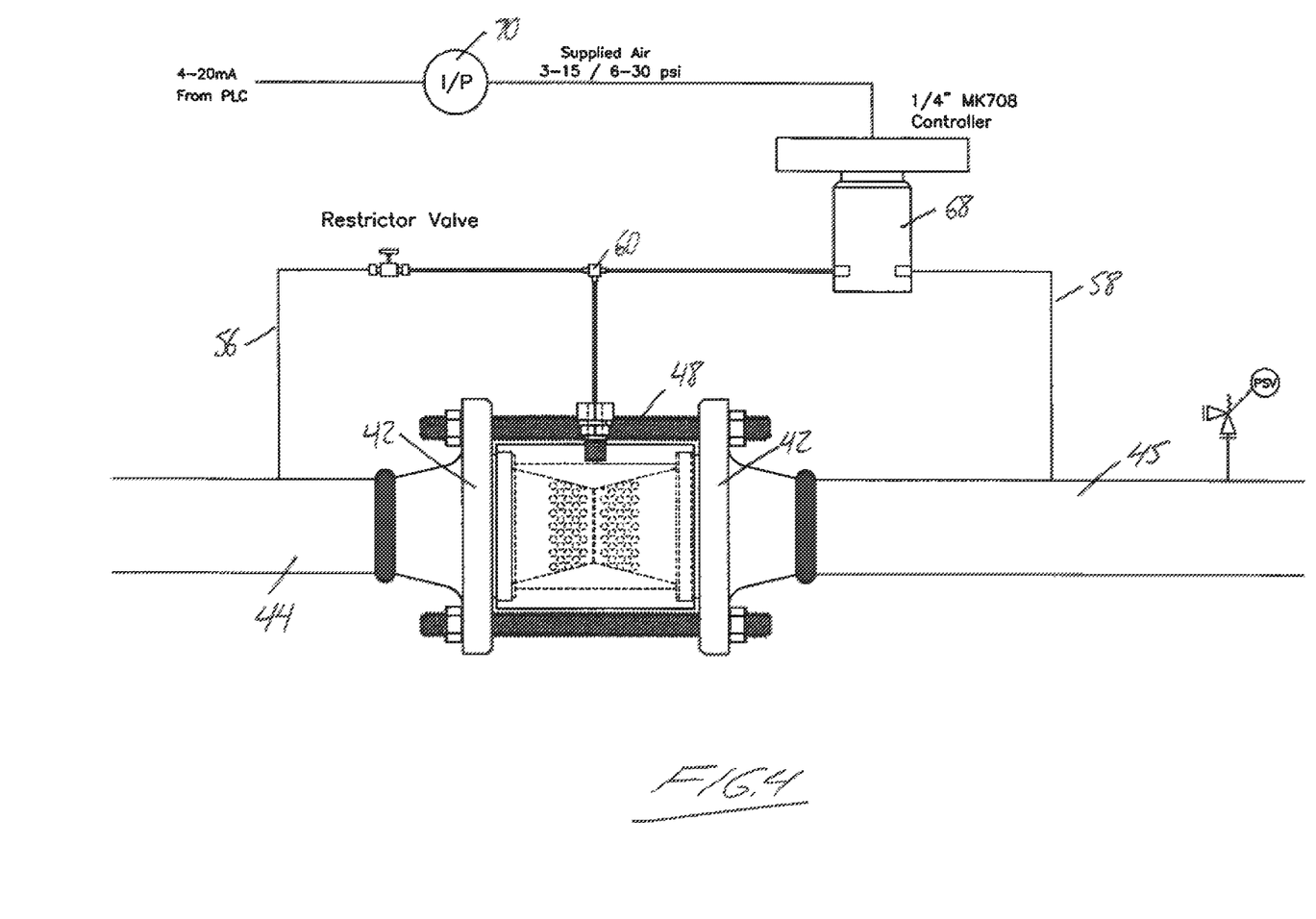
FIG. 4 illustrates use of the multi-purpose valve of FIG. 1 in an automated pressure or flow control application.

In the application shown in FIG. 4, the multi-purpose valve 10 forms a flow control valve for controlling flow from upstream pipe 44 to downstream pipe 45. The first and second sensing lines 56, 58 are connected to the upstream and downstream pipes 44, 45 and the charge chamber 46 of the multi-purpose valve 10 in the manner described above for FIG. 3, with the restrictor valve 64 once again installed in the first sensing line 56. The manually adjusted regulator valve 66 of the FIG. 3 pressure reduction application is replaced with a normally-closed pneumatic flow control valve 68 whose input is fed by a variable pressure air source 70, such as an electro-pneumatic regulator (or "I/P" regulator), the output air pressure of which is varied based on signals from a programmable logic controller (PLC) whose inputs are monitoring conditions relevant to the desired operation of the multi-purpose valve 10. An example of a suitable pneumatic flow control valve is an MK708 fractional-flow control valve. An example of one context in which the FIG. 4 application is useful is for suction (inlet) flow control on a compressor.

The flow control valve 68 is controlled by a variable-pressure pneumatic signal (e.g. a 3-15 or 6-30 psi pneumatic signal). At the lower end of the pressure signal range (e.g. 3 or 6 psi), the flow control valve 68 is closed, and at the upper end of the signal range (e.g. 15 or 30 psi), the flow control valve 68 is fully open. When the flow control valve 68 is closed, all of the upstream pressure $P_1$ entering the first sensing line 56 is dumped into the charge chamber 46 of the multi-purpose valve 10, which therefore locks into a closed condition with the sleeve tightly sealed closed over the perforated components to achieve 100% bubble tightness. When the MK708 flow control valve 68 receives a pneumatic signal to open based on the prescribed conditions detected by the PLC, the pressure in the charge chamber 46 is able to bleed down through the second sensing line 58 until this charge chamber pressure is exceeded by the upstream pressure $P_1$, at which time the resilient sleeve 22 will expand and allow flow through the multi-purpose valve 10. The degree to which the flow control valve opens determines the size of the pressure differential across the sleeve, which in turn controls how far the resilient sleeve expands. This determines the size of the annular space that opens up between the sleeve and the perforated components, and thus determines the resulting flow through the multi-purpose valve 10. The restrictor valve 64 should be adjusted to an intermediate setting at start-up, and then can be adjusted to fine tune the valve to respond and operate as per the requirements of the installation. While the illustrated embodiment uses a pneumatic control valve, electronic or hydraulic control valves may alternatively be used in the same manner.

Figure 5:
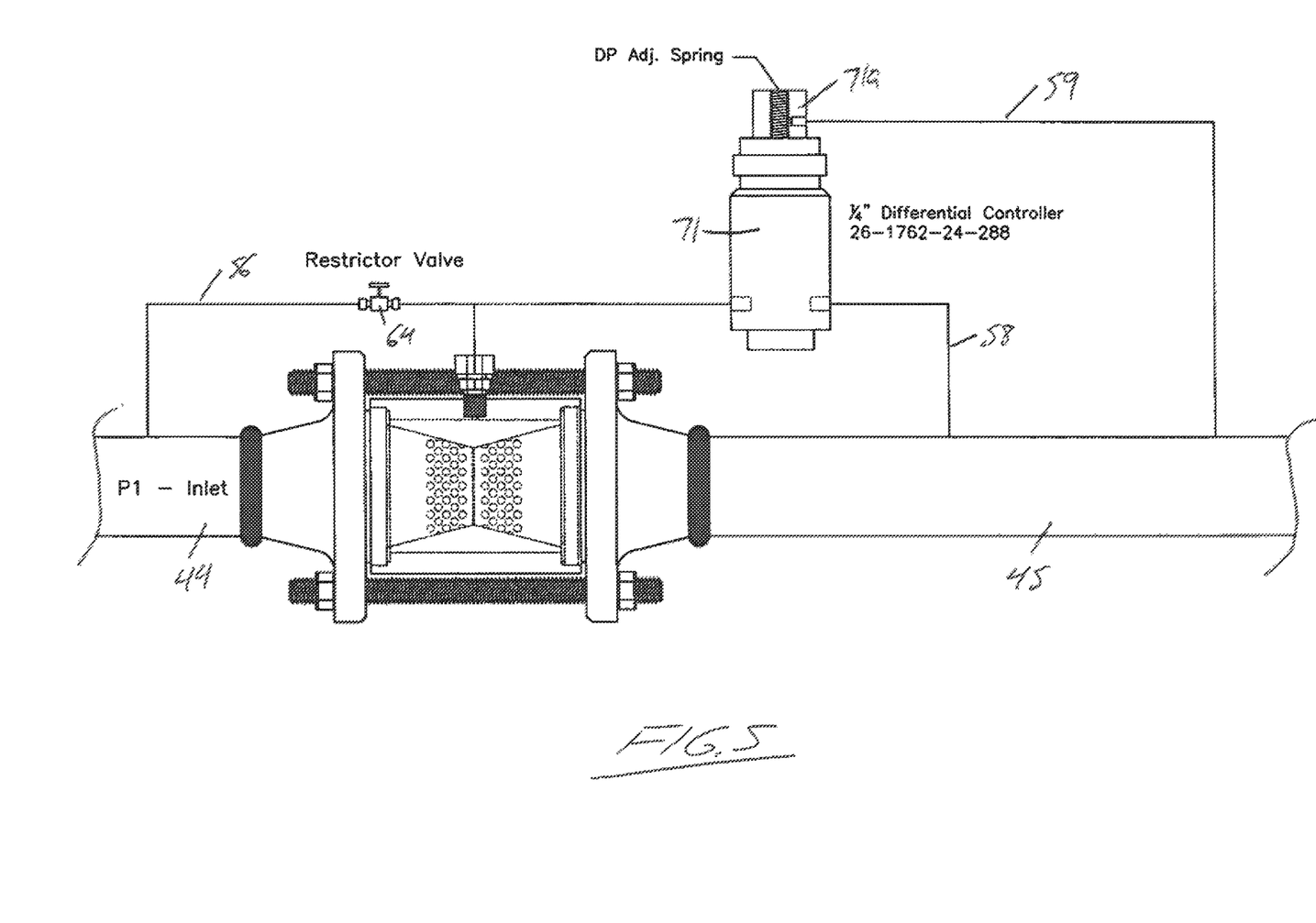
FIG. 5 illustrates use of the multi-purpose valve of FIG. 1 in a differential pressure control application.

FIG. 5 shows an application in which the multi-purpose valve serves as a differential pressure control valve. The valve is installed between the upstream and downstream pipes 44, 45 with the charge port 26 connected to said pipes 44, 45 by the first and second sensing lines 56, 58, as described above for the applications shown in FIGS. 3 and 4. However, a normally-open differential control valve 71 replaces the regulator or flow control valve in the second sensing line 58 of the FIG. 3 or 4 arrangement. A third sensing line 59 is connected between the dome 71a of the different control valve 71 and the downstream pipe 45. Again, the restrictor valve should be opened to an intermediate setting at startup, and can be later changed once the valve is running to attain optimum performance. The normally-open differential control valve 71 senses both the upstream and downstream pressures $P_1$ and $P_2$ and can control a differential across the multipurpose valve 10 based upon the spring tension inside the dome (0 to 100 psi). As the downstream pressure $P_2$ increases or decreases, the upstream pressure will change accordingly to maintain the desired pressure differential across the multi-purpose valve 10.

Figure 6:
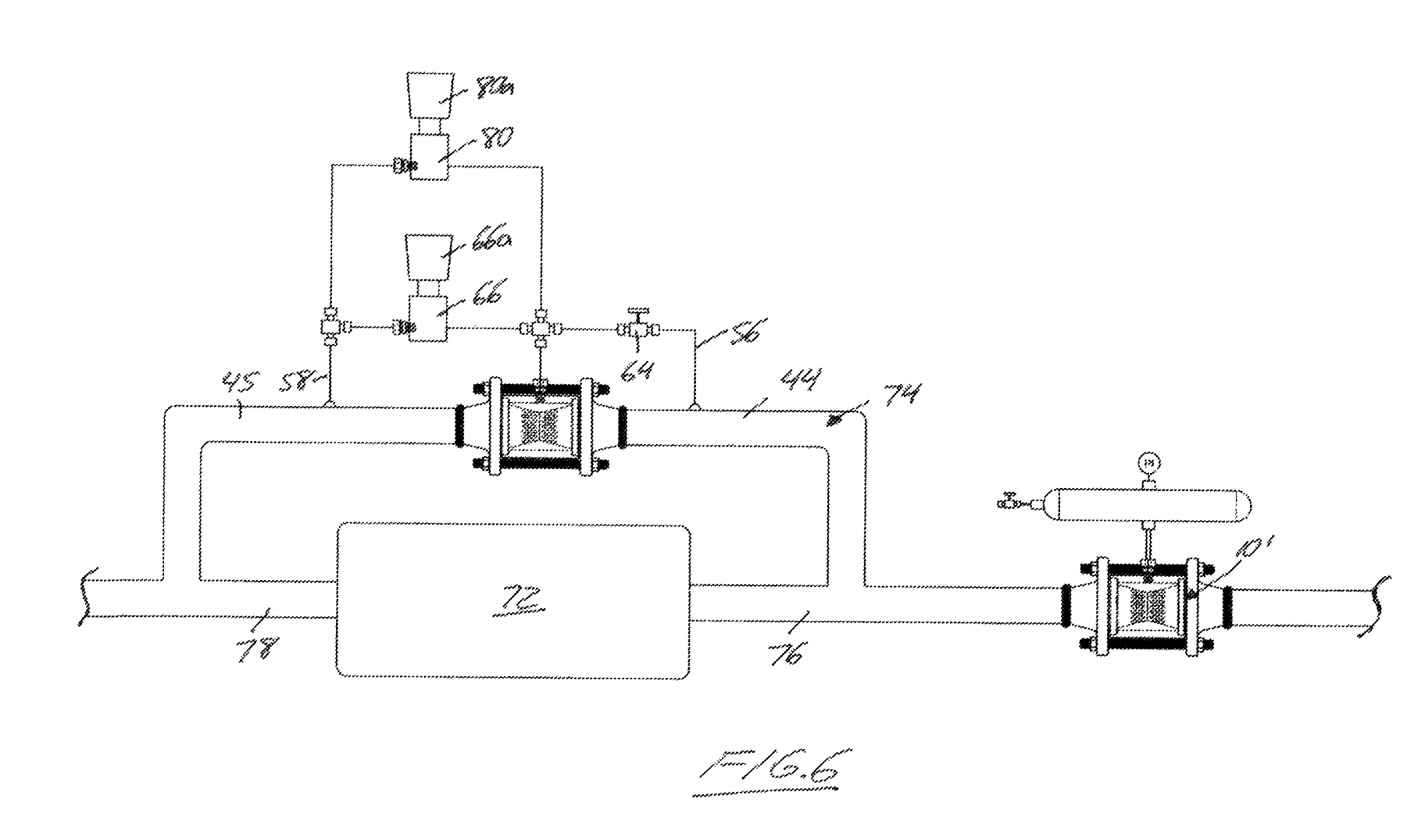
FIG. 6 illustrates use of the multi-purpose valve of FIG. 1 in a pump/compressor bypass application.

FIG. 6 illustrates an application in which one multi-purpose valve 10 is setup to perform both back-pressure and pressure reducing functions at the same time. The particularly illustrated example of such application is the simultaneous control of both bypass and suction pressure on a pump or compressor 72. Such installation is illustrated in the figure, where the multi-purpose 10 is installed in the bypass line 74 of the pump/compressor 72.

Using the same upstream/downstream terminology used for the other applications above, the upstream pipe 44 refers to that which is connected to the input end 16b of the multi-purpose valve 10 to introduce fluid thereto, and the downstream pipe 45 refers to that which is connected to the output end 16b of the multi-purpose valve 10 to exhaust fluid therefrom. In the illustrated pump/compressor application, the upstream pipe 44 feeding the multi-purpose valve 10 branches off the discharge line 76 of the pump/compressor 72, and the downstream pipe 45 exhausting the multi-purpose valve 10 connects to the intake suction line 78 of the pump/compressor 72. The upstream and downstream pipes 44, 45 and the multi-purpose valve 10 installed therein thus collectively define the bypass line 74 of the pump/compressor. The first and second sensing lines 56, 58 are connected to the upstream and downstream pipes 44, 45, respectively, and also to the charging port 26, with the restrictor valve 64 in the first sensing line 56 and the pressure reducing regulator valve 66 in the second sensing line 58, as described above for the pressure reducing application of FIG. 3. Additionally, a back-pressure regulator valve 80 is installed in parallel to the pressure reducing regulator valve 66.

Setting the pressure reducing regulator valve 66 will control the downstream pressure $P_2$ and the back-pressure regulator valve 80 will control the upstream pressure $P_1$. Setting the pressures is accomplished by turning the adjusting caps 66a, 80a on the regulators 66, 80 either clockwise or counter clockwise to increase or decrease the set pressures. The restrictor valve 64 is again used to adjust the sensitivity or response time of the multi-purpose valve 10 once the system is up and running.

If the pressure reducing regulator valve 66 is not factory set to a suitable set point at start up, the pressure reducing regulator valve 66 should be backed off to a closed position to restrict any flow through the multi-purpose valve to avoid having the downstream pressure $P_2$ exceed the desired working pressure. The easiest way to set the downstream pressure $P_2$ is to close a valve downstream of the multi-purpose valve in the bypass line 74. Once the upstream pipe 44 is fully pressured up, one would start to open the pressure reducing regulator valve 66, which would start to allow fluid flow though the multi-purpose valve 10. Then, continued opening of the pressure reducing regulator valve 66 is performed until the desired downstream pressure $P_2$ is achieved.

To set the back-pressure regulator valve 80, one starts with the adjusting cap 80*a* backed off all of the way to set the valve's back-pressure to 0 psi, thereby ensuring that the valve does not over pressure the upstream pipe 44. The adjusting cap of the back-pressure regulator valve 80 is then turned in the other direction to increase the valves back-pressure until the desired set point is reached. Once the upstream and downstream pressures $P_1$ and $P_2$ are set, the downstream valve in the bypass line 74 can be opened to start the flow through the downstream pipe 45 of the bypass line into the intake suction line 78 of the pump/compressor 72. Again, the restrictor valve 64 should be adjusted to an intermediate setting before start up, and later adjusted as needed once the system is up and running to achieve the necessary operating parameters of the installation.

As shown in FIG. 6, a second multi-purpose valve 10' may be installed as a back-pressure valve in the discharge line 76 of the pump at a location downstream of the bypass line 74. The illustrated example is shown in the context of an injection well fed by the pump 72.

Figure 7:
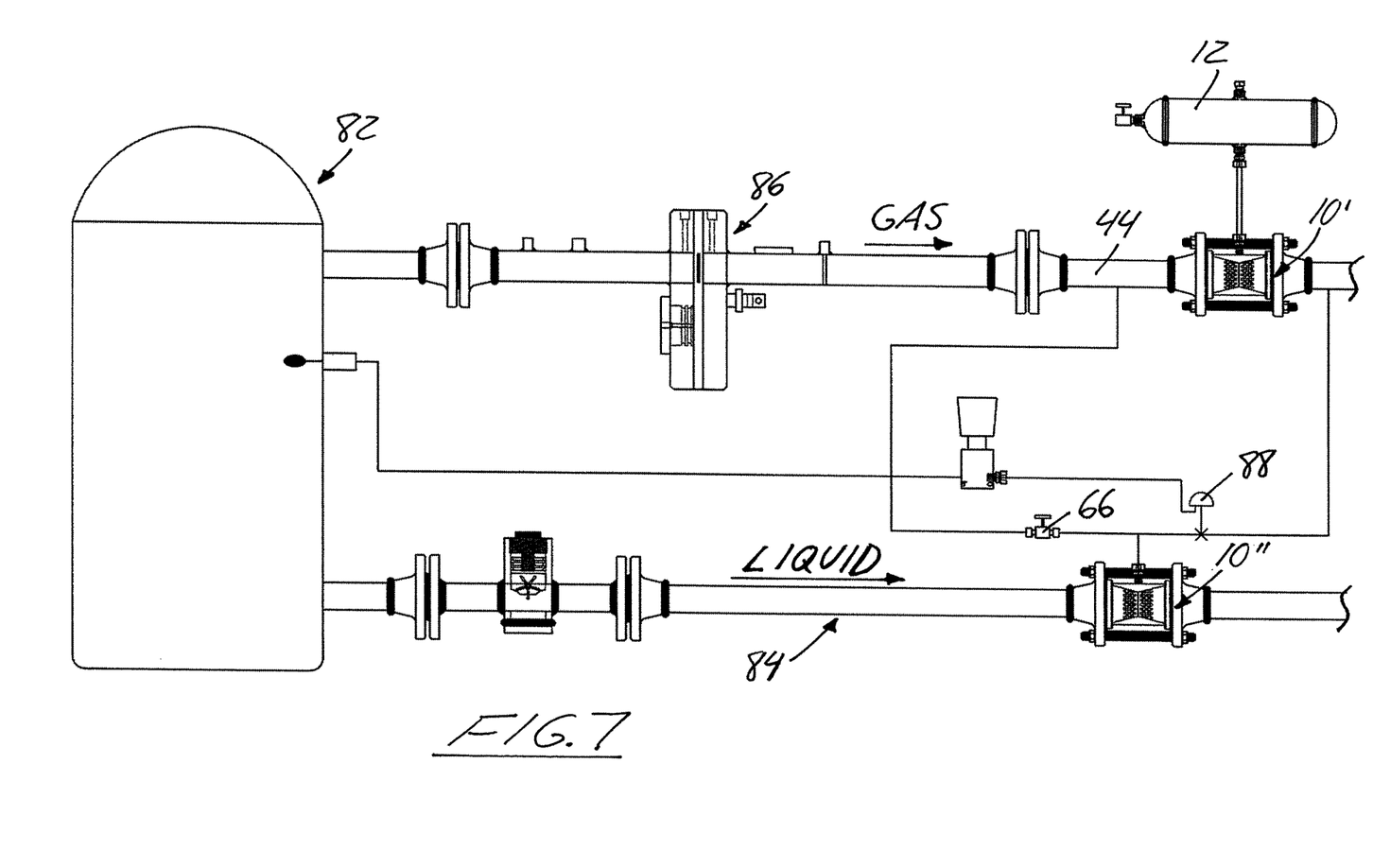
FIG. 7 illustrates use of the multi-purpose valve of FIG. 1 in a liquid-dump separation application.

FIG. 7 illustrates use of the multi-purpose valve in a liquid-dump separation application. In this application, an incoming supply line (not shown) feeds a source emulsion (e.g. a water/gas or other two-phase emulsion, or water/oil/gas or other three-phase emulsion) into an upper inlet port near the top of a separator 82, which is a vessel having a series of baffles below the inlet port so that impact of the emulsion on the baffles helps break the gas out of the liquid part emulsion (e.g. water, oil or combination thereof). The liquid part of the emulsion falls to the bottom of the vessel, where a drain line 84 is available to empty the separator vessel of its liquid through a lower drain port. Gas freed from the liquid rises upward to the top of the vessel for and is exhausted therefrom through a gas line 86.

This application employs two of the multi-purpose valves, one of which is installed in the outgoing gas line 86 as a back-pressure valve 10' of the type described above in relation to FIG. 2, and the other of which is installed in the outgoing drain line 86 as a dump valve 10'. The back-pressure valve 10' closes off the gas line 86 so long as the pressure upstream of the valve 10' (i.e. the gas pressure from the separator vessel) is less than the set pressure of the back-pressure valve's expansion vessel 12. Once the separator vessel's gas pressure exceeds the set pressure of the back-pressure valve 10', the back-pressure valve opens to relieve the separated gas from the separator vessel through the gas line 86.

The dump valve 10" in the drain line 84 is configured to open only once the vessel has been filled to a certain predetermined level, as confirmed by a level sensor 88 (e.g. float switch) installed on the separator vessel 84. This way, sufficient filling of the separator to achieve a suitable level of gas separation is ensured before the vessel is drained. When the float switch or other level sensor 88 is triggered, this signal is used to open the dump valve 10".

In the illustrated embodiment, the signal from the level sensor triggers opening of a solenoid valve 88 in a sensing line 58 that is connected between the charge chamber of the dump valve 10" and the downstream pipe on the downstream side of the back-pressure valve 10' in the gas line 86. The other sensing line 56 teed into the charge chamber of the dump valve 10" is connected to the upstream pipe 44 on the upstream side of the back-pressure valve 10' in the gas line 86. This way, the gas pressure of the separator vessel will normally hold the dump valve 10" closed in order to prevent the draining of liquid from the separator vessel through the drain line 84, until the level sensor is triggered. At this point, the opening of sensing line 58 by the solenoid valve 88 vents the charge chamber of the dump valve 10" to the lower-pressure downstream side of the back-pressure valve 10' in the gas line 86. This reduces the charge chamber pressure of the dump valve 10" so that the sleeve thereof can expand under the hydraulic pressure exerted thereon by the liquid in the separator vessel and drain line 84, thus draining the separator vessel.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A valve installation comprising:
a first sleeve valve installed in a bypass line of a pump or compressor and comprising:
an outer housing having an inlet by which fluid is introducible into an interior of said housing and an outlet by which said fluid is exhaustible from said housing;
an inlet channel extending further into the interior of the housing from the inlet thereof to a closed end of said inlet channel situated opposite of the inlet of the housing;
a first circumferential wall surrounding said inlet channel between the closed end thereof and the inlet of the housing;
an outlet channel extending further into the interior of the housing from the outlet thereof to a closed end of said outlet channel situated opposite to the outlet of the housing;
a second circumferential wall surrounding said outlet channel between the closed end thereof and the outlet of the housing;
a first set of one or more perforations in said first circumferential wall;
a second set of one or more perforations in said second circumferential wall;
a resiliently expandable sleeve disposed around the first and second circumferential walls within the interior of the outer housing in a position overlying said first and second sets of perforations;
an expansion gap between said resiliently expandable sleeve and interior wall surfaces of the housing to accommodate expansion of said sleeve outwardly from the first and second circumferential walls to open up said first and second sets of perforations; and
a charging port opening into the interior the housing and communicating with the expansion gap therein to enable pressurization of said expansion gap, whereby the sleeve is expandable off of the first and second circumferential walls to open up the first and second sets of one more perforations when an inlet pressure in the inlet channel exceeds a charge pressure in the expansion gap to enable fluid flow between the inlet and outlet channels via the first and second sets of perforations;
an upstream pipe of the bypass line coupled to the sleeve valve in a position feeding into the inlet thereof;
a downstream pipe of the bypass line coupled to the sleeve valve in a position exhausting the outlet thereof;
a first sensing line installed in a configuration enabling pressurization of the expansion gap from the upstream pipe; and a second sensing line installed in a configuration enabling venting of the expansion gap to the downstream pipe;

a pressure reducing regulator valve installed in the second sensing line;

a back-pressure regulator valve connected in parallel with said pressure reducing regular valve; and a matching second sleeve valve of same type as the first sleeve valve and installed in a discharge line running from an outlet of the pump or compressor, wherein the charge port of said second sleeve valve is connected to a pre-loaded expansion vessel to pressurize the expansion gap inside the valve housing of the second sleeve valve, and thereby prevent opening of the second valve until the inlet channel of the second valve achieves greater pressure than said pre-loaded expansion vessel.

2. A back-pressure valve assembly comprising:

a sleeve valve comprising:
- an outer housing having an inlet by which fluid is introducible into an interior of said housing and an outlet by which said fluid is exhaustible from said housing;
- an inlet channel extending further into the interior of the housing from the inlet thereof to a closed end of said inlet channel situated opposite of the inlet of the housing;
- a first circumferential wall surrounding said inlet channel between the closed end thereof and the inlet of the housing;
- an outlet channel extending further into the interior of the housing from the outlet thereof to a closed end of said outlet channel situated opposite to the outlet of the housing;
- a second circumferential wall surrounding said outlet channel between the closed end thereof and the outlet of the housing;
- a first set of one or more perforations in said first circumferential wall;
- a second set of one or more perforations in said second circumferential wall;
- a resiliently expandable sleeve disposed around the first and second circumferential walls within the interior of the outer housing in a position overlying said first and second sets of perforations;
- an expansion gap between said resiliently expandable sleeve and interior wall surfaces of the housing to accommodate expansion of said sleeve outwardly from the first and second circumferential walls to open up said first and second sets of perforations; and
- a charging port opening into the interior the housing and communicating with the expansion gap therein to enable pressurization of said expansion gap, whereby the sleeve is expandable off of the first and second circumferential walls to open up the first and second sets of one more perforations when an inlet pressure in the inlet channel exceeds a charge pressure in the expansion gap to enable fluid flow between the inlet and outlet channels via the first and second sets of perforations; and a pre-loaded expansion vessel including a pre-loaded charge of gas therein, said pre-loaded expansion vessel being connected to the charge port of the sleeve valve to pressurize the expansion gap inside the valve housing of the sleeve valve to a set charge pressure using said pre-loaded charge of gas, and to thereby prevent opening of the sleeve valve until the inlet pressure in the inlet channel exceeds said set charge pressure; and wherein the pre-loaded expansion vessel is physically supported on the outer housing of the sleeve valve.

3. The back-pressure valve assembly of claim 2 wherein the sleeve valve is installed in a discharge line running from an outlet of a pump or compressor.

4. The back-pressure valve assembly of claim 3 in combination with a matching second sleeve valve installed in a bypass line of said pump or compressor.

5. The back-pressure valve assembly of claim 2 further comprising a connection line installed between the pre-loaded expansion vessel and the sleeve in a manner that both connects said pre-loaded expansion vessel to the charging port of the sleeve valve, and physically supports the pre-loaded expansions vessel on the outer housing of the sleeve valve.

6. The back-pressure valve assembly of claim 2 wherein the connection line is connected only to the pre-loaded expansion vessel and the sleeved valve.

7. The back-pressure valve assembly of claim 2 further comprising a loading valve connected to an inlet of the pre-loaded expansion vessel for pre-loading of the gas into the pre-loaded expansion vessel via said loading valve.

8. The back-pressure valve assembly of claim 7 further comprising a slip line that is connected to said loading valve for sourcing of said gas from an upstream pipe that feeds into the inlet channel of the sleeve valve.

* * * * *